United States Patent
Shima (10) Patent No.: US 11,825,109 B2
(45) Date of Patent: *Nov. 21, 2023

(54) IMAGE CODING APPARATUS, IMAGE CODING METHOD, AND PROGRAM, AND IMAGE DECODING APPARATUS, IMAGE DECODING METHOD AND PROGRAM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

This patent is subject to a terminal disclaimer.

(21) Appl. No.: 17/400,747

(22) Filed: Aug. 12, 2021

(65) Prior Publication Data
US 2021/0377555 A1    Dec. 2, 2021

Related U.S. Application Data

(63) Continuation of application No. 16/853,466, filed on Apr. 20, 2020, now Pat. No. 11,122,283, which is a (Continued)

(30) Foreign Application Priority Data

Jul. 9, 2013  (JP) .................................. 2013-143697

(51) Int. Cl.
*H04N 19/176* (2014.01)
*H04N 19/50* (2014.01)
(Continued)

(52) U.S. Cl.
CPC ............. *H04N 19/50* (2014.11); *H04N 19/11* (2014.11); *H04N 19/12* (2014.11);
(Continued)

(58) Field of Classification Search
CPC ........ H04N 19/50; H04N 19/11; H04N 19/12; H04N 19/124; H04N 19/176; H04N 19/182; H04N 19/44; H04N 19/70; H04N 19/91

See application file for complete search history.

(56) References Cited

U.S. PATENT DOCUMENTS

2008/0226183 A1* 9/2008 Lei .......................... G06V 10/28
                                                              382/233
2009/0161759 A1  6/2009 Seo et al.
(Continued)

FOREIGN PATENT DOCUMENTS

CN    102754437 A    10/2012
JP    2009105700 A    5/2009

*Primary Examiner* — Dave Czekaj
*Assistant Examiner* — Berteau Joisil
(74) *Attorney, Agent, or Firm* — Canon U.S.A., Inc. IP Division (57) ABSTRACT

The present invention is made to enable switching between lossless coding which prioritizes compatibility with a lossy coding process and lossless coding which prioritizes compression performance.
An image coding apparatus of the present invention includes the following configuration. The image coding apparatus which encodes an image on a block-by-block basis includes a first coding unit and a second coding unit. The first coding unit performs irreversible compression coding on a received first block. The second coding unit performs reversible compression coding on a received second block. The second coding unit encodes the second block by using either of a first intra prediction mode for performing intra prediction on a block-by-block basis and a second intra prediction mode for performing intra prediction on a pixel-by-pixel basis.

7 Claims, 9 Drawing Sheets

Related U.S. Application Data continuation of application No. 14/903,252, filed as application No. PCT/JP2014/003503 on Jul. 1, 2014, now Pat. No. 10,666,963.

(51) Int. Cl.
<table>
<tr><td><i>H04N 19/11</i></td><td>(2014.01)</td></tr>
<tr><td><i>H04N 19/12</i></td><td>(2014.01)</td></tr>
<tr><td><i>H04N 19/182</i></td><td>(2014.01)</td></tr>
<tr><td><i>H04N 19/70</i></td><td>(2014.01)</td></tr>
<tr><td><i>H04N 19/124</i></td><td>(2014.01)</td></tr>
<tr><td><i>H04N 19/44</i></td><td>(2014.01)</td></tr>
<tr><td><i>H04N 19/91</i></td><td>(2014.01)</td></tr>
</table>

(52) U.S. Cl.
CPC ......... *H04N 19/124* (2014.11); *H04N 19/176* (2014.11); *H04N 19/182* (2014.11); *H04N 19/44* (2014.11); *H04N 19/70* (2014.11); *H04N 19/91* (2014.11)

(56) References Cited

U.S. PATENT DOCUMENTS

| | | | | |
|---|---|---|---|---|
| 2011/0317769 A1* | 12/2011 | Tanaka | ................. | H04N 19/176 375/E7.2 |
| 2013/0077696 A1* | 3/2013 | Zhou | .................... | H04N 19/172 375/E7.026 |
| 2013/0114716 A1* | 5/2013 | Gao | .................... | H04N 19/182 375/240.14 |

\* cited by examiner

IMAGE CODING APPARATUS, IMAGE CODING METHOD, AND PROGRAM, AND IMAGE DECODING APPARATUS, IMAGE DECODING METHOD AND PROGRAM

CROSS REFERENCE OF RELATED APPLICATIONS

This application is a Continuation of U.S. patent application Ser. No. 16/853,466, filed Apr. 20, 2020, which is a Continuation of U.S. patent application Ser. No. 14/903,252, filed Jan. 6, 2016, now issued as U.S. Pat. No. 10,666,963, issued May 26, 2020, which is a National Stage Entry of PCT/JP2014/003503 filed Jul. 1, 2014, which claims the benefit of Japan Patent Application No. 2013-143697, filed Jul. 9, 2013, each of which are hereby incorporated by reference herein in their entirety.

TECHNICAL FIELD

The present invention relates to an image coding apparatus, an image coding method, and a program, particularly to an intra prediction process performed on a lossless coding block.

BACKGROUND ART

A system, H.264/MPEG-4 AVC (hereinafter, abbreviated as H.264), is known as a coding system for compressing and recording a movie (see NPL 1).

In H.264, lossless coding may be performed by performing a transformation bypass process in which orthogonal transformation and quantization are bypassed. In particular, lossless coding has a characteristic in which, when intra prediction is performed in a horizontal or vertical direction, differential pulse-code modulation (DPCM) coding is performed. In DPCM coding, instead of normal prediction performed on the basis of coded pixels around a target pixel, prediction is performed on a pixel-by-pixel basis in a block.

Recently, an activity for achieving an international standard for a higher-efficiency coding system has started as a successor to H.264. The Joint Collaborative Team on Video Coding (JCT-VC) was founded by the International Organization for Standardization (ISO)/the International Electrotechnical Commission (IEC) and the International Telecommunications Union-Telecommunication Standardization Sector (ITU-T). In the JCT-VC, standardization has progressed, resulting in the high efficiency video coding (HEVC) system (hereinafter, referred to as HEVC).

The first version of the standardization which is regarded as a basic specification in HEVC was completed in January, 2013. Like H.264, the first version of HEVC employs lossless coding in which orthogonal transformation and quantization are bypassed. However, the first version of HEVC has a characteristic in which, like typical lossy coding, intra prediction is performed on a block-by-block basis (see NPL 2).

In HEVC, from the viewpoint of compatibility with lossy coding, intra prediction on a block-by-block basis which is similar to that used in lossy coding is used in lossless coding. However, in general, it is considered that the DPCM coding on a pixel-by-pixel basis which is used also in H.264 has higher compression efficiency in lossless coding. Therefore, there arises a problem in that the compression efficiency of lossless coding in HEVC is not sufficiently high.

CITATION LIST

Non Patent Literature

[NPL 1]
ITU-T H.264 (January 2012) Advanced Video Coding for Generic Audiovisual Services
[NPL 2]
Contributed Article by the JCT-VC, JCTVC-L1003, http://phenix.int-evry.fr/jct/doc_end_user/documents/12_Geneva/wg11/

SUMMARY OF INVENTION

Therefore, the present invention is made to enable switching between a lossless coding process which prioritizes compatibility with a lossy coding process and a lossless coding process which prioritizes compression performance.

As a unit for addressing the above-described problem, a typical image coding apparatus of the present invention has the following configuration. That is, the image coding apparatus which encodes an image on a block-by-block basis includes a first coding unit and a second coding unit. The first coding unit performs irreversible compression coding on a received first block. The second coding unit performs reversible compression coding on a received second block. The second coding unit encodes the second block by using either of a first intra prediction mode for performing intra prediction on a block-by-block basis and a second intra prediction mode for performing intra prediction on a pixel-by-pixel basis.

In addition, a typical image decoding apparatus of the present invention has the following configuration. That is, the image decoding apparatus which decodes a coded image on a block-by-block basis includes a first decoding unit and a second decoding unit. The first decoding unit decodes a first block which has been subjected to irreversible compression coding. The second decoding unit decodes a second block which has been subjected to reversible compression coding. The second decoding unit decodes the second block by using either of a first intra prediction mode for performing intra prediction on a block-by-block basis and a second intra prediction mode for performing intra prediction on a pixel-by-pixel basis.

Further features of the present invention will become apparent from the following description of exemplary embodiments with reference to the attached drawings.

The present invention achieves coding and decoding which support both of a lossless coding process which prioritizes compatibility with a lossy coding process and a lossless coding process which prioritizes compression performance. As a result, switching may be performed between these lossless coding processes in accordance with the requirement for an application.

DESCRIPTION OF EMBODIMENTS

The present invention will be described in detail on the basis of embodiments with reference to the attached drawings. Configurations in the embodiments described below are merely examples, and the present invention is not limited to the illustrated configurations.

First Embodiment

Figure 1:
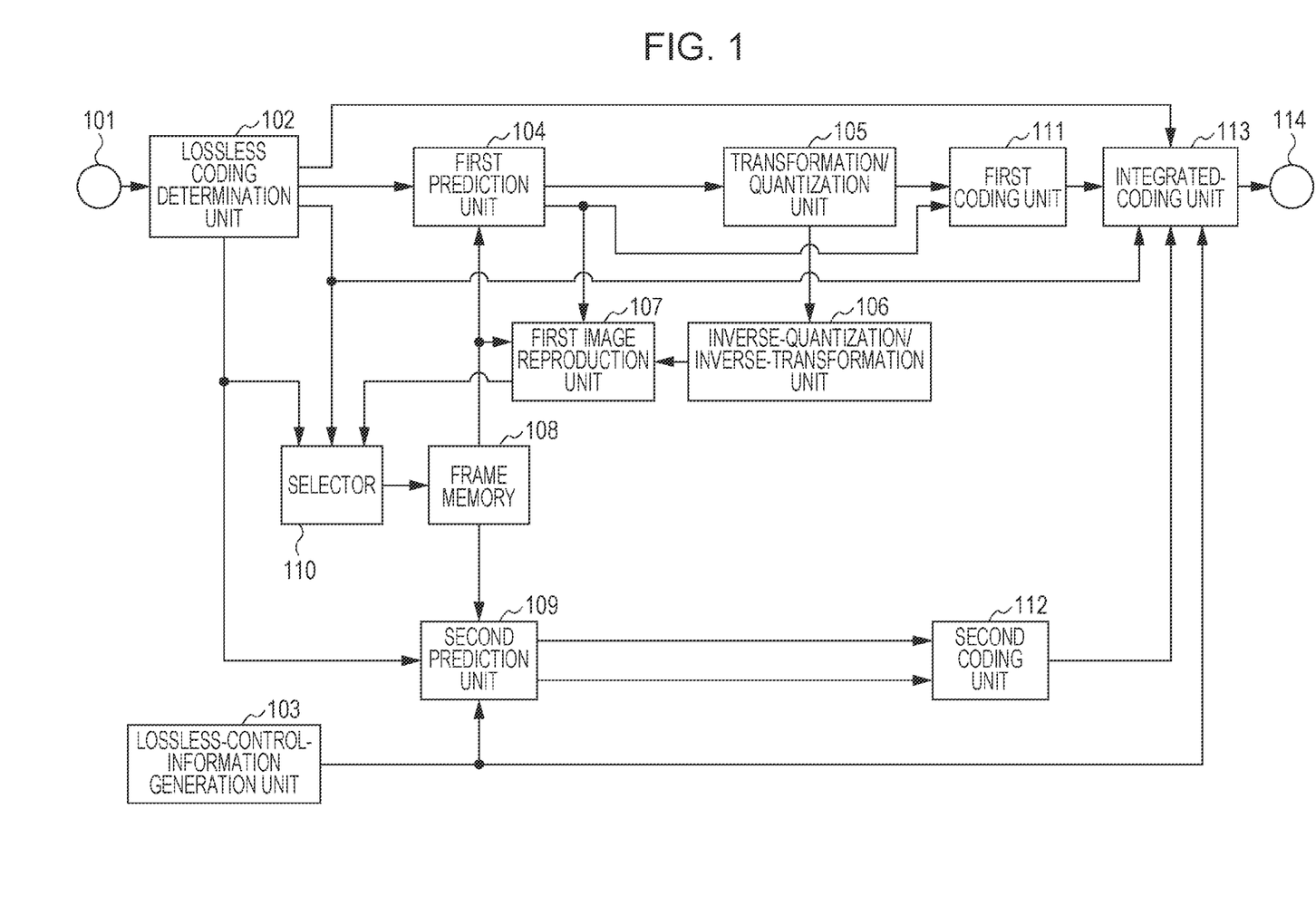
FIG. 1 is a block diagram illustrating the configuration of an image coding apparatus according to a first embodiment.

A first embodiment of the present invention will be described below by using the drawings. FIG. 1 is a block diagram illustrating an image coding apparatus according to the first embodiment. In FIG. 1, a terminal 101 is a terminal for inputting image data. A lossless coding determination unit 102 cuts out multiple blocks from the received image data, and determines whether reversible compression coding (hereinafter, referred to as lossless coding) or irreversible compression coding (hereinafter, lossy coding) is to be performed on each of the blocks. A lossless-control-information generation unit 103 generates and outputs lossless control information indicating what kind of intra prediction process is to be performed on a lossless coding block which is to be subjected to lossless coding.

A first prediction unit 104 performs, for example, intra prediction which is intra-frame prediction and inter prediction which is inter-frame prediction on each of the blocks of the image data when lossy coding is selected, and generates predicted image data. The first prediction unit 104 further calculates prediction errors from the received image data and the predicted image data, and outputs the prediction errors. In addition to this, information required for the prediction, e.g., information about a prediction mode, is output. Hereinafter, the information required for prediction is called first prediction information.

When lossy coding is selected, a transformation/quantization unit 105 performs orthogonal transformation on the prediction errors on a block-by-block basis to obtain transformed coefficients, and further quantizes the transformed coefficients to obtain quantized coefficients. When lossy coding is selected, an inverse-quantization/inverse-transformation unit 106 performs inverse quantization on the quantized coefficients which are output from the transformation/quantization unit 105, so as to reproduce the transformed coefficients, and further performs inverse orthogonal transformation on the transformed coefficients so as to reproduce the prediction errors. A frame memory 108 stores the reproduced image data.

When lossy coding is selected, a first image reproduction unit 107 generates predicted image data by referring to the frame memory 108 as appropriate, on the basis of the first prediction information which is output from the first prediction unit 104, generates reproduced image data from the predicted image data and the received prediction errors, and outputs the reproduced image data.

When lossless coding is selected, a second prediction unit 109 performs intra prediction, inter prediction, and the like on each of the blocks of the image data so as to generate predicted image data. Similarly to the first prediction unit 104, the second prediction unit 109 calculates prediction errors from the received image data and the predicted image data, and outputs information required for prediction, such as a prediction mode, as well as the prediction errors. Hereinafter, the information required for prediction is called second prediction information.

A selector 110 outputs a received image which is output from the lossless coding determination unit 102, or a reproduced image which is output from the first image reproduction unit 107, to the frame memory 108 on the basis of lossless coding block information which is described below and which is output from the lossless coding determination unit 102.

A first coding unit 111 encodes the quantized coefficients which are output from the transformation/quantization unit 105, and the first prediction information which is output from the first prediction unit 104 so as to generate and output first coded data.

A second coding unit 112 encodes the second prediction information and the prediction errors which are output from the second prediction unit 109 so as to generate and output second coded data.

An integrated-coding unit 113 encodes the outputs from the lossless coding determination unit 102 and the lossless-control-information generation unit 103 so as to generate coded header data. The integrated-coding unit 113 further adds the coded data which is output from the first coding unit 111 and the second coding unit 112 so as to generate and output a bit stream.

A terminal 114 is a terminal for outputting the bit stream generated by the integrated-coding unit 113 to the outside.

An image coding operation performed by the above-described image coding apparatus will be described below. In the first embodiment, movie data is input on a frame-by-frame basis, but static image data of one frame may be input.

Image data of one frame which is input from the terminal 101 is received by the lossless coding determination unit 102. Prior to the coding process, the lossless-control-information generation unit 103 determines what kind of intra prediction process is to be performed on pixels in a lossless coding block. The lossless-control-information generation unit 103 outputs the determination information as lossless control information to the second prediction unit 109 and the integrated-coding unit 113.

Figure 3A:
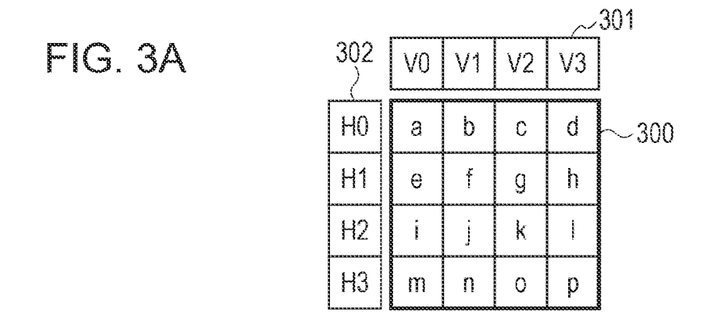
FIG. 3A is a diagram illustrating an exemplary intra prediction process performed on a lossless coding block.
Figure 3B:
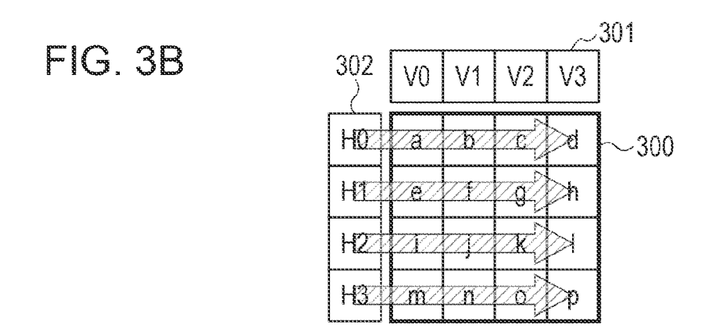
FIG. 3B is a diagram illustrating an exemplary intra prediction process performed on a lossless coding block.
Figure 3C:
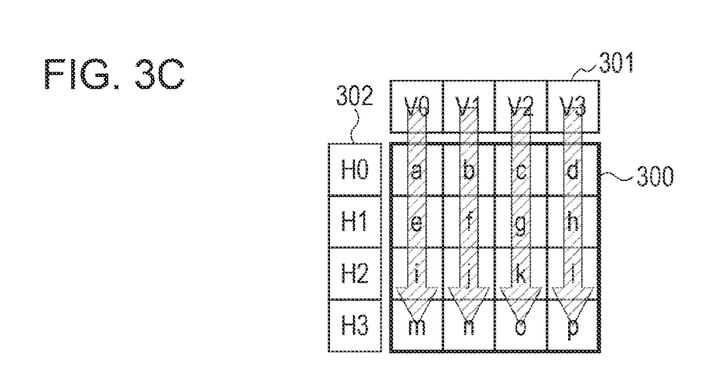
FIG. 3C is a diagram illustrating an exemplary intra prediction process performed on a lossless coding block.
Figure 3D:
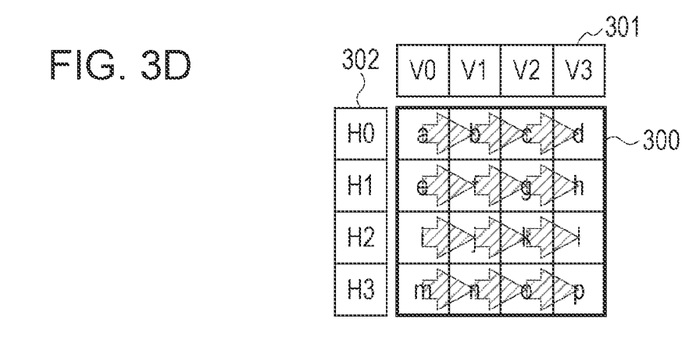
FIG. 3D is a diagram illustrating an exemplary intra prediction process performed on a lossless coding block.
Figure 3E:
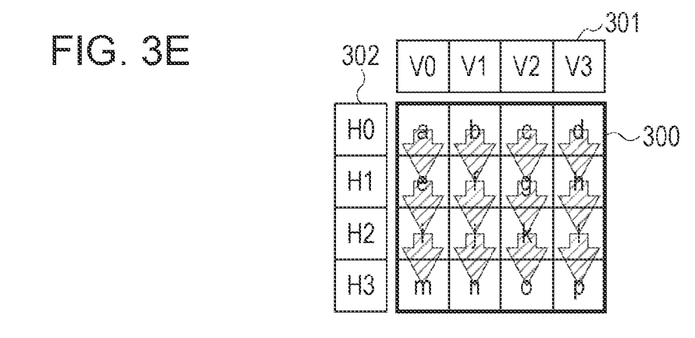
FIG. 3E is a diagram illustrating an exemplary intra prediction process performed on a lossless coding block.

To make the description simple, FIGS. 3A to 3E illustrate exemplary intra prediction. FIG. 3A illustrates a block 300 on which intra prediction is performed. The examples in FIGS. 3A to 3E use a block of 4×4 pixels, but the size and the shape are not limited to this. Pixels a to p which form 4×4 pixels are included in the block 300. FIG. 3B is a diagram illustrating how to perform horizontal intra prediction on a block-by-block basis, and horizontal prediction is performed starting from a pixel group 302 (H0 to H3) which is located on the left and which is adjacent to the block 300. Such prediction is called a block-based horizontal prediction mode. FIG. 3C is a diagram illustrating how to perform vertical intra prediction on a block-by-block basis, and vertical prediction is performed starting from a pixel group 301 (V0 to V3) which is located on the upper side and which is adjacent to the block 300. Such prediction is called a block-based vertical prediction mode. FIG. 3D is a diagram illustrating how to perform horizontal DPCM prediction on a pixel-by-pixel basis, and horizontal prediction is performed starting from the pixel which is adjacent on the left side of each of the pixels. Such prediction is called a pixel-based horizontal DPCM mode. In the first embodiment, the pixel value of each of the pixels located on the left end in a target block is encoded as it is, but the present invention is not limited to this. The difference between the pixel value of each of the pixels located on the left end in the target block and the pixel value of a corresponding one of the pixels located on the right end in the block located on the left side of the target block may be encoded. FIG. 3E is a diagram illustrating how to perform vertical DPCM prediction on a pixel-by-pixel basis, and vertical prediction is performed starting from a pixel which is adjacent to the upper side of each of the pixels. Such prediction is called a pixel-based vertical DPCM mode. Similarly to the pixel-based horizontal DPCM mode, in the first embodiment, the pixel value of each of the pixels located on the upper end in a target block is encoded as it is, but the present invention is not limited to this. The difference between the pixel value of each of the pixels located on the upper end in the target block and the pixel value of a corresponding one of the pixels located on the lower end of the block located on the upper side of the target block may be encoded.

In the first embodiment, the above-described lossless control information indicates whether a block-based intra prediction mode (FIG. 3B or 3C) or a pixel-based intra prediction mode (FIG. 3D or 3E) is used for the pixels in a lossless coding block. Specifically, when the lossless control information has a value of 0, block-based prediction in FIG. 3B or 3C is used. When the lossless control information has a value of 1, pixel-based prediction in FIG. 3D or 3E is used.

How to determine the lossless control information is not particularly limited to this, and the determination may be made by using the characteristics of an input image or by using a user input. Alternatively, the determination may be made on the basis of the intra prediction process supported by an image decoding apparatus which decodes a bit stream which is output from the image coding apparatus. The integrated-coding unit 113 encodes the lossless control information and generates lossless-control-information code (first information code). The way of coding is not particularly specified, and Golomb coding, arithmetic coding, Huffman coding, and the like may be used.

The lossless coding determination unit 102 cuts received image data into multiple blocks, and determines whether lossless coding or lossy coding is to be performed for each of the blocks. The way of determination is not limited to this, and the determination may be made by using the characteristics of the input image or by using a user input. The information indicating whether lossless coding or lossy coding is to be performed on a block to be encoded is output as the lossless coding block information to the integrated-coding unit 113. The lossless coding determination unit 102 further outputs the received image data, as it is, to the first prediction unit 104, the second prediction unit 109, and the selector 110.

In addition, the lossless coding determination unit 102 generates lossless coding information which is information indicating whether or not a block subjected to lossless coding is included in a frame or a sequence to be processed. The integrated-coding unit 113 encodes the lossless coding information and generates lossless-coding-information code (second information code). The way of coding is not specifically specified, and Golomb coding, arithmetic coding, Huffman coding, or the like may be used.

The process of coding after that is split in accordance with whether the lossless coding determination unit 102 selects lossless coding or lossy coding. The operation of coding image data when the lossless coding determination unit 102 selects lossy coding will be described.

The lossless coding determination unit 102 inputs the image data of a block to be encoded, to the first prediction unit 104. The first prediction unit 104 performs prediction on a block-by-block basis, generates prediction errors, and inputs the prediction errors to the transformation/quantization unit 105. In addition, the first prediction unit 104 generates the first prediction information, and outputs the first prediction information to the first coding unit 111 and the first image reproduction unit 107. The transformation/quantization unit 105 performs orthogonal transformation/quantization on the received prediction errors, and generates quantized coefficients. The generated quantized coefficients are input to the first coding unit 111 and the inverse-quantization/inverse-transformation unit 106. The inverse-quantization/inverse-transformation unit 106 performs inverse quantization on the received quantized coefficients so as to reproduce transformed coefficients, performs inverse orthogonal transformation on the transformed coefficients thus reproduced, so as to reproduce prediction errors, and outputs the reproduced prediction errors to the first image reproduction unit 107.

The first image reproduction unit 107 reproduces a predicted image by referring to the frame memory 108 as appropriate, on the basis of the first prediction information received from the first prediction unit 104. The first image reproduction unit 107 reproduces image data from the reproduced predicted image and the reproduced prediction errors which are received from the inverse-quantization/inverse-transformation unit 106, and stores it in the frame memory 108.

The first coding unit 111 performs entropy coding on the quantized coefficients generated by the transformation/quantization unit 105 and the first prediction information received by the first prediction unit 104, on a block-by-block basis so as to generate first coded data. The way of entropy coding is not specifically specified, and Golomb coding, arithmetic coding, Huffman coding, or the like may be used. The generated first coded data is output to the integrated-coding unit 113.

The operation of coding image data when the lossless coding determination unit 102 selects lossless coding will be described.

The lossless coding determination unit 102 inputs the image data of a block to be encoded, to the second prediction unit 109. The second prediction unit 109 performs prediction on the basis of the lossless control information received from the lossless-control-information generation unit 103, generates prediction errors, and inputs the generated prediction errors to the second coding unit 112. The second prediction information is also input to the second coding unit 112.

The selector 110 outputs the input image received from the lossless coding determination unit 102 or the reproduced image received from the first image reproduction unit 107, to the frame memory 108 on the basis of the lossless coding block information received from the lossless coding determination unit 102. Specifically, when the lossless coding block information represents lossless coding, the input image received from the lossless coding determination unit 102 is output to the frame memory 108. When the lossless coding block information represents lossy coding, the reproduced image received from the first image reproduction unit 107 is output to the frame memory 108.

The second coding unit 112 performs entropy coding on the second prediction information and the prediction errors received from the second prediction unit 109, and generates second coded data. The way of entropy coding is not specifically specified, and Golomb coding, arithmetic coding, Huffman coding, or the like may be used. The generated second coded data is output to the integrated-coding unit 113.

The integrated-coding unit 113 multiplexes the lossless-control-information code generated prior to the coding process, the lossless-coding-information code, the first coded data generated by the first coding unit 111, the second coded data generated by the second coding unit 112, and the like so as to form a bit stream. Finally, the bit stream formed by the integrated-coding unit 113 is output from the terminal 114 to the outside.

Figure 6A:
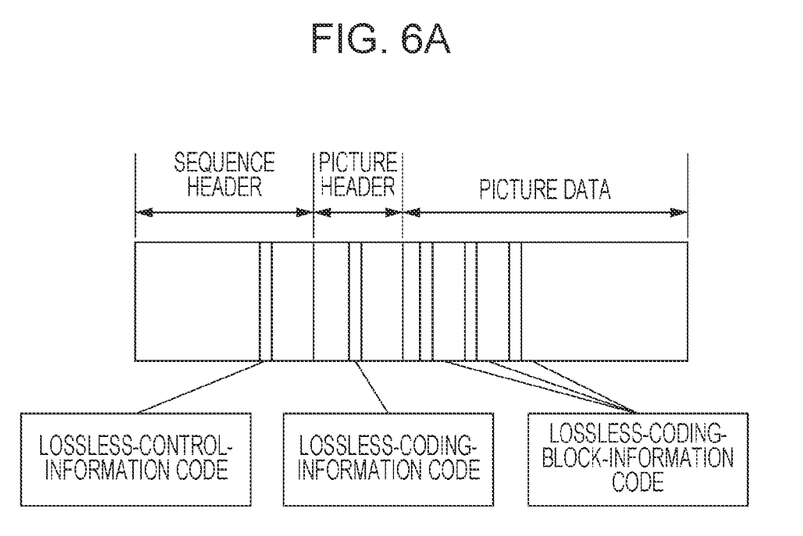
FIG. 6A is a diagram illustrating an exemplary bit stream structure which is generated in the first embodiment and which is to be decoded in the second embodiment.

FIG. 6A illustrates an exemplary bit stream including the lossless coding information and the lossless control information which are encoded. The lossless coding information is included as a lossless-coding-information code in the header of a picture or the like. For example, the lossless-coding-information code is a flag of one bit. When the lossless-coding-information code has a value of 1, a bit stream is likely to include a lossless coding block. When the lossless-coding-information code has a value of 0, a bit stream is unlikely to include a lossless coding block. The lossless control information is included as a lossless-control-information code in the header of a sequence or the like. The lossless control information is information having at least one bit. When the lossless-control-information code has a value of 1, an intra prediction process is performed on a lossless coding block on a pixel-by-pixel basis. When the lossless-control-information code has a value of 0, an intra prediction process is performed on a lossless coding block on a block-by-block basis.

In the first embodiment, the lossless control information is included in a sequence header, and the lossless-coding-information code is included in a picture header.

Regarding the lossless coding block information, a lossless-coding-block-information code (third information code) is included in each of the blocks in a bit stream. When a lossless-coding-block-information code has a value of 1, the block is subjected to lossless coding. When a lossless-coding-block-information code has a value of 0, the block is subjected to lossy coding.

Figure 4:
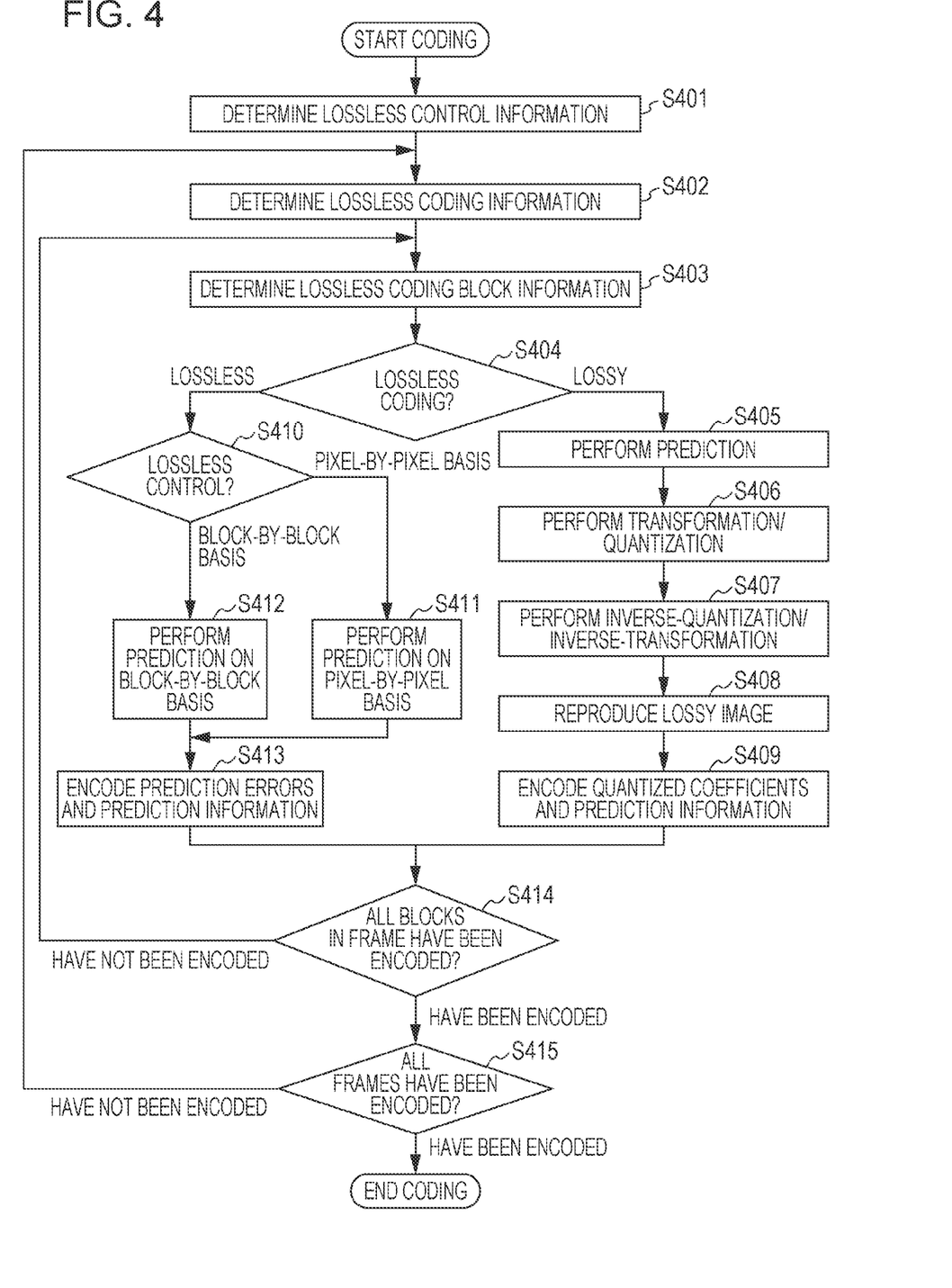
FIG. 4 is a flowchart of an image coding process performed by the image coding apparatus according to the first embodiment.

FIG. 4 is a flowchart of a coding process performed by the image coding apparatus according to the first embodiment.

In step S401, the lossless-control-information generation unit 103 determines what kind of intra prediction process is to be performed on the pixels in a lossless coding block. The information representing the determined intra prediction process is the lossless control information. The integrated-coding unit 113 encodes the lossless control information.

In step S402, the lossless coding determination unit 102 determines whether or not lossless coding is to be performed on a frame-by-frame basis. The information representing the determination result is the lossless coding information. The integrated-coding unit 113 encodes the lossless coding information.

In step S403, the lossless coding determination unit 102 cuts the received image data into multiple blocks, determines whether lossless coding or lossy coding is to be performed on a block-by-block basis, and uses the determination result as the lossless coding block information.

In step S404, the image coding apparatus determines whether or not lossless coding is to be performed on the block to be encoded. If lossless coding is to be performed, the process proceeds to step S410. If lossy coding is to be performed, the process proceeds to step S405.

In step S405, the first prediction unit 104 performs intra prediction or inter prediction, and generates first prediction information and predicted image data. The first prediction unit 104 further calculates prediction errors from the received image data and the predicted image data. In step S406, the transformation/quantization unit 105 performs orthogonal transformation on the prediction errors calculated in step S405, so as to generate transformed coefficients. The transformation/quantization unit 105 further quantizes the transformed coefficients so as to generate quantized coefficients. In step S407, the inverse-quantization/inverse-transformation unit 106 performs inverse quantization and inverse orthogonal transformation on the quantized coefficients generated instep S406, so as to reproduce prediction errors. In step S408, the first image reproduction unit 107 reproduces a predicted image on the basis of the first prediction information generated in step S405. The first image reproduction unit 107 further reproduces image data from the predicted image thus reproduced and the prediction errors generated in step S407. In step S409, the first coding unit 111 encodes the first prediction information generated in step S405, and the quantized coefficients generated in step S406, so as to generate first coded data. The integrated-coding unit 113 generates a bit stream which also includes other coded data.

In step S410, the second prediction unit 109 makes determination on the basis of the lossless control information generated in step S401. If the lossless control information has a value of 1 which indicates that intra prediction is to be performed in a pixel-by-pixel basis, the process proceeds to step S411. If the lossless control information has a value of 0 which indicates that intra prediction is to be performed on a block-by-block basis, the process proceeds to step S412. In step S411, the second prediction unit 109 performs prediction on a pixel-by-pixel basis, and generates second prediction information and predicted image data. The second prediction unit 109 further calculates prediction errors from the received image data and the predicted image data. In step S412, the second prediction unit 109 performs prediction on a block-by-block basis, and generates second prediction information and predicted image data. The second prediction unit 109 calculates prediction errors from the received image data and the predicted image data. In step S413, the second coding unit 111 encodes the second prediction information and the prediction errors which are generated in step S411 or step S412, and generates second coded data. The integrated-coding unit 113 generates a bit stream which also includes other coded data.

In step S414, the image coding apparatus determines whether or not all of the blocks in the frame have been encoded. If all of the blocks have been encoded, the process proceeds to step S415. Otherwise, the process returns back to step S403 to process the next block. In step S415, the image coding apparatus determines whether or not all of the frames have been encoded. If all of the frames have been encoded, the coding process is ended. Otherwise, the process returns back to step S402 to process the next frame.

The above-described configuration and operations, especially the operation in step S401, which enables control of an intra prediction process performed on the pixels in a lossless coding block, enables whether compression efficiency or compatibility with lossy coding is to be prioritized to be selected when necessary. Specifically, when the lossless control information is set to 0 in step S401, intra prediction is performed on a block-by-block basis in step S412, enabling a bit stream which prioritizes compatibility with a lossy coding block to be generated. When the lossless control information is set to 1 in step S401, intra prediction is performed on a pixel-by-pixel basis in step S411, enabling a bit stream which prioritizes compression efficiency to be generated.

In the first embodiment, lossless coding and lossy coding are performed by the first prediction unit 104 and the second prediction unit 109 which are independent from each other. The same prediction unit may perform lossless coding and lossy coding. In addition, the first coding unit 111 and the second coding unit 112 which are independent from each other are used. Alternatively, the same coding unit may perform lossless coding and lossy coding. In the first embodiment, the case in which lossless/lossy coding blocks are mixed is assumed. When it is obvious that a stream to be encoded has only lossless coding blocks, the components for lossy coding may be omitted. In this case, specifically, the first prediction unit 104, the transformation/quantization unit 105, the inverse-quantization/inverse-transformation unit 106, the first image reproduction unit 107, and the first coding unit 111 may be omitted.

In the first embodiment, FIGS. 3A to 3E illustrate the exemplary modes used when a lossless coding block is subjected to intra prediction. The intra prediction modes in the present invention are not limited to these. That is, any mode may be employed as long as the mode is one supported by an image decoding apparatus which decodes a bit stream which is output from the image coding apparatus.

Figure 6B:
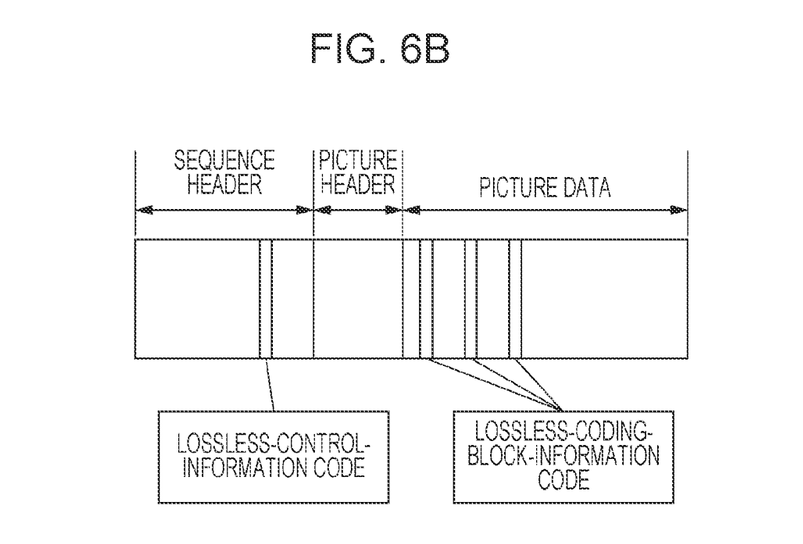
FIG. 6B is a diagram illustrating an exemplary bit stream structure which is generated in the first embodiment and which is to be decoded in the second embodiment.

The configuration of a bit stream is not limited to this. For example, coding as illustrated in FIG. 6B may be performed. FIG. 6B illustrates an example in which each of the blocks includes a lossless-coding-block-information code indicating whether lossless coding or lossy coding has been performed on a block-by-block basis. In this case, the picture header which is the header of a frame does not include a lossless-coding-information code. In this configuration, each of the blocks includes a lossless-coding-block-information code, achieving an effect of easy differentiation between a lossless coding block and a lossy coding block.

The data length of the lossless-control-information code and that of the lossless-coding-information code are not limited these. For example, the lossless-control-information code may have additional bits when other intra prediction processes are additionally performed.

Figure 7:
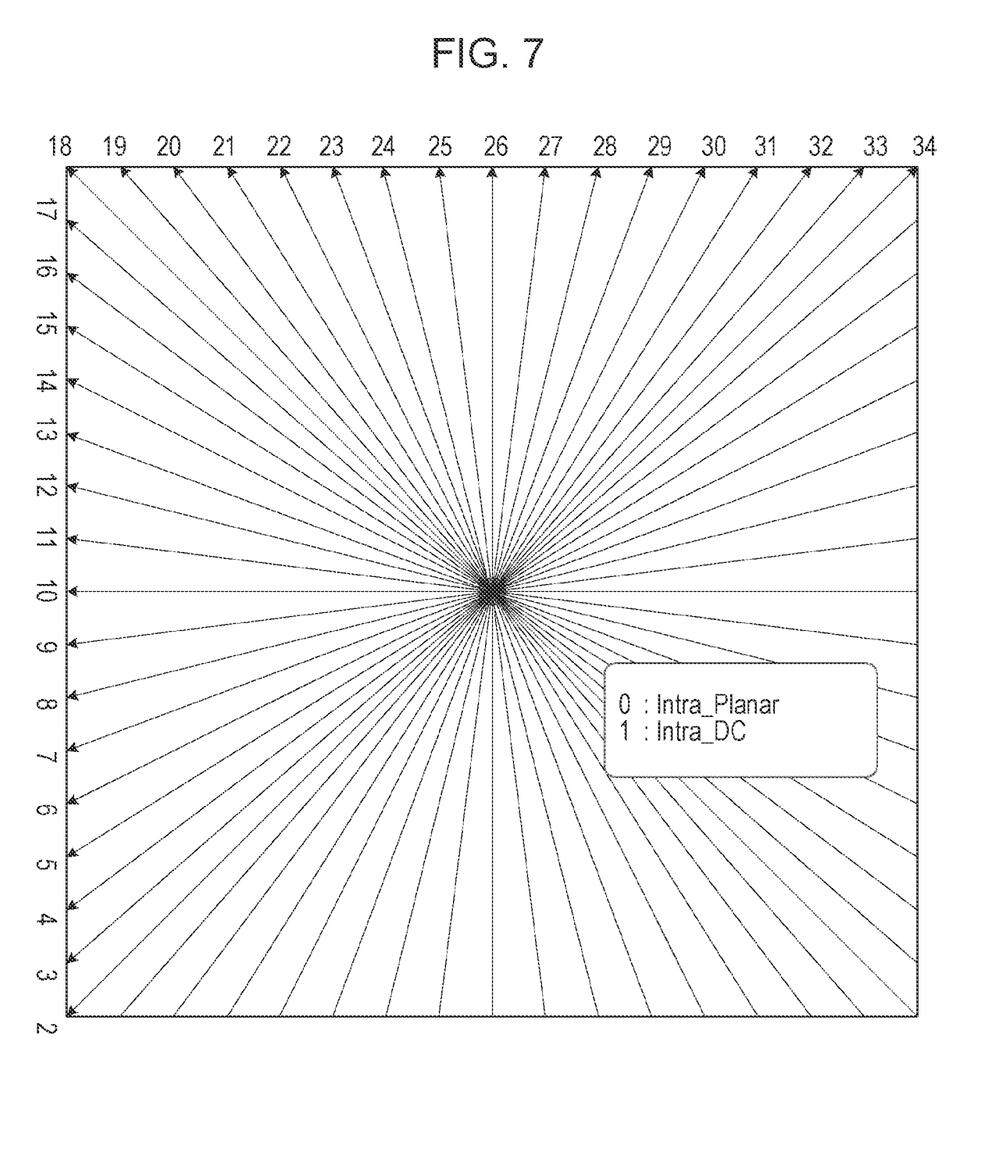
FIG. 7 is a diagram illustrating the directions of intra prediction modes in HEVC.

In the first embodiment, when the lossless control information has a value of 1, intra prediction is performed on a pixel-by-pixel basis regardless of the direction of the intra prediction. The present invention is not limited to this. For example, in HEVC, as illustrated in FIG. 7, there are 35 prediction modes from 0 (planar prediction) to 34 (diagonal prediction along a line from the lower left to the upper right). In some of the prediction modes, intra prediction may be performed on a pixel-by-pixel basis. In the other modes, intra prediction may be performed on a block-by-block basis. For example, intra prediction on a pixel-by-pixel basis may be applied only to the mode 10 (vertical prediction) and the mode 26 (horizontal prediction). This minimizes an increase in hardware cost caused by introducing intra prediction on a pixel-by-pixel basis.

Second Embodiment

Figure 2:
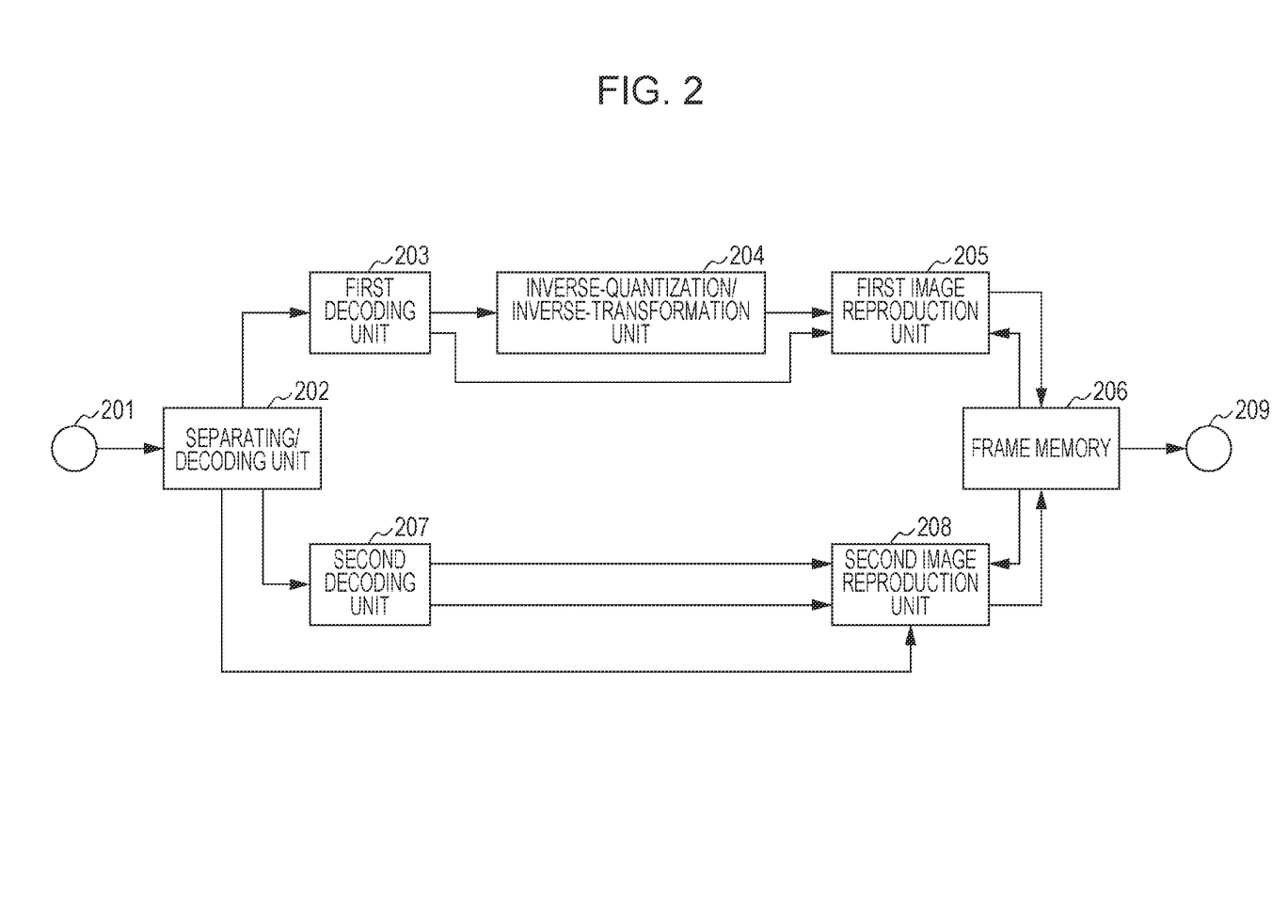
FIG. 2 is a block diagram illustrating the configuration of an image decoding apparatus according to a second embodiment.

FIG. 2 is a block diagram illustrating the configuration of an image decoding apparatus according to a second embodiment of the present invention. The second embodiment will be described by taking an example in which coded data generated in the first embodiment is decoded. A terminal 201 is a terminal for inputting a coded bit stream.

A separating/decoding unit 202 separates information about the decoding process and coded data about coefficients from the bit stream, and decodes coded data which is present in the header of the bit stream. In the second embodiment, separating/decoding unit 202 reproduces the lossless control information and the lossless coding block information and outputs the lossless control information and the lossless coding block information to the subsequent stage. The separating/decoding unit 202 performs a reverse operation of that performed by the integrated-coding unit 113 in FIG. 1.

A first decoding unit 203 decodes the first coded data which is output from the separating/decoding unit 202, and reproduces quantized coefficients and first prediction information. Similarly to the inverse-quantization/inverse-transformation unit 106 in FIG. 1, an inverse-quantization/inverse-transformation unit 204 receives the quantized coefficients on a block-by-block basis, performs inverse quantization so as to obtain transformed coefficients, and performs inverse orthogonal transformation so as to reproduce prediction errors.

A frame memory 206 stores image data of a reproduced frame. Similarly to the first image reproduction unit 107 in FIG. 1, a first image reproduction unit 205 generates predicted image data by referring to the frame memory 206 as appropriate, on the basis of the received first prediction information. The first image reproduction unit 205 generates reproduced image data from the predicted image data and the prediction errors reproduced by the inverse-quantization/inverse-transformation unit 204, and outputs the reproduced image data.

A second decoding unit 207 decodes the second coded data which is output from the separating/decoding unit 202, and reproduces prediction errors and second prediction information. A second image reproduction unit 208 generates predicted image data of a block which has been subjected to lossless coding, by referring to the frame memory 206 as appropriate, on the basis of the second prediction information and the lossless control information which are received, generates reproduced image data from the predicted image data and the received prediction errors, and outputs the reproduced image data. A terminal 209 is a terminal for outputting the image data to the outside.

The image decoding operations performed by the above-described image decoding apparatus will be described below. In the second embodiment, a bit stream generated in the first embodiment is decoded.

In FIG. 2, a bit stream received from the terminal 201 is input to the separating/decoding unit 202. The separating/decoding unit 202 separates information about the decoding process and coded data about coefficients from the bit stream, and decodes coded data which is present in the header of the bit stream. Specifically, the lossless control information and the lossless coding block information are reproduced. In the second embodiment, the lossless-coding-information code which is extracted from the picture header of the bit stream illustrated in FIG. 6A is decoded. When the lossless-coding-information code has a value of 1, the lossless-coding-block-information code included in each of the blocks in the picture data which is coded data for each of the frames is used to determine whether lossless coding or lossy coding has been performed on the block. That is, in the case where the lossless-coding-information code has a value of 1 and where the lossless-coding-block-information code also has a value of 1, the block is a lossless coding block. Otherwise, the block is a lossy coding block. This information is used as lossless coding block information. The separating/decoding unit 202 extracts the lossless-control-information code from the sequence header, decodes the code, and reproduces lossless control information.

Then, the coded data of each of the blocks in the picture data is output to the subsequent stage. When the lossless coding block information indicates that the block is a lossy coding block, the separating/decoding unit 202 extracts first coded data, and outputs the first coded data to the first decoding unit 203. When the block is a lossless coding block, the separating/decoding unit 202 extracts second coded data, and outputs the second coded data to the second decoding unit 207. The separating/decoding unit 202 outputs the lossless control information to the second image reproduction unit 208.

The first decoding unit 203 decodes the first coded data, and reproduces quantized coefficients and first prediction information. The quantized coefficients thus reproduced are output to the inverse-quantization/inverse-transformation unit 204, and the reproduced first prediction information is output to the first image reproduction unit 205.

For a block which has been subjected to lossy coding, the inverse-quantization/inverse-transformation unit 204 performs inverse quantization on the quantized coefficients which are received, so as to generate transformed coefficients, and performs inverse orthogonal transformation on the transformed coefficients so as to reproduce prediction errors. The reproduced prediction errors are input to the first image reproduction unit 205.

The first image reproduction unit 205 reproduces a predicted image by referring to the frame memory 206 as appropriate, on the basis of the first prediction information received from the first decoding unit 203. The first image reproduction unit 205 reproduces image data from the predicted image and the prediction errors received from the inverse-quantization/inverse-transformation unit 204, and stores the reproduced image data into the frame memory 206. The stored image data is used for reference which is made when prediction is performed.

The second decoding unit 207 decodes the second coded data, and reproduces prediction errors and second prediction information. The prediction errors and the second prediction information thus reproduced are output to the second image reproduction unit 208.

The second image reproduction unit 208 reproduces a predicted image by referring to the frame memory 206 as appropriate, on the basis of the second prediction information received from the second decoding unit 207 and the lossless control information received from the separating/decoding unit 202. Similarly to the first embodiment, when the lossless control information has a value of 0, prediction on a block-by-block basis is used. When the lossless control information has a value of 1, prediction on a pixel-by-pixel basis is used. The second image reproduction unit 208 reproduces image data from the predicted image and the prediction errors received from the second decoding unit 207, and stores the reproduced image data into the frame memory 206. The image stored in the frame memory 206 is finally output from the terminal 209 to the outside.

Figure 5:
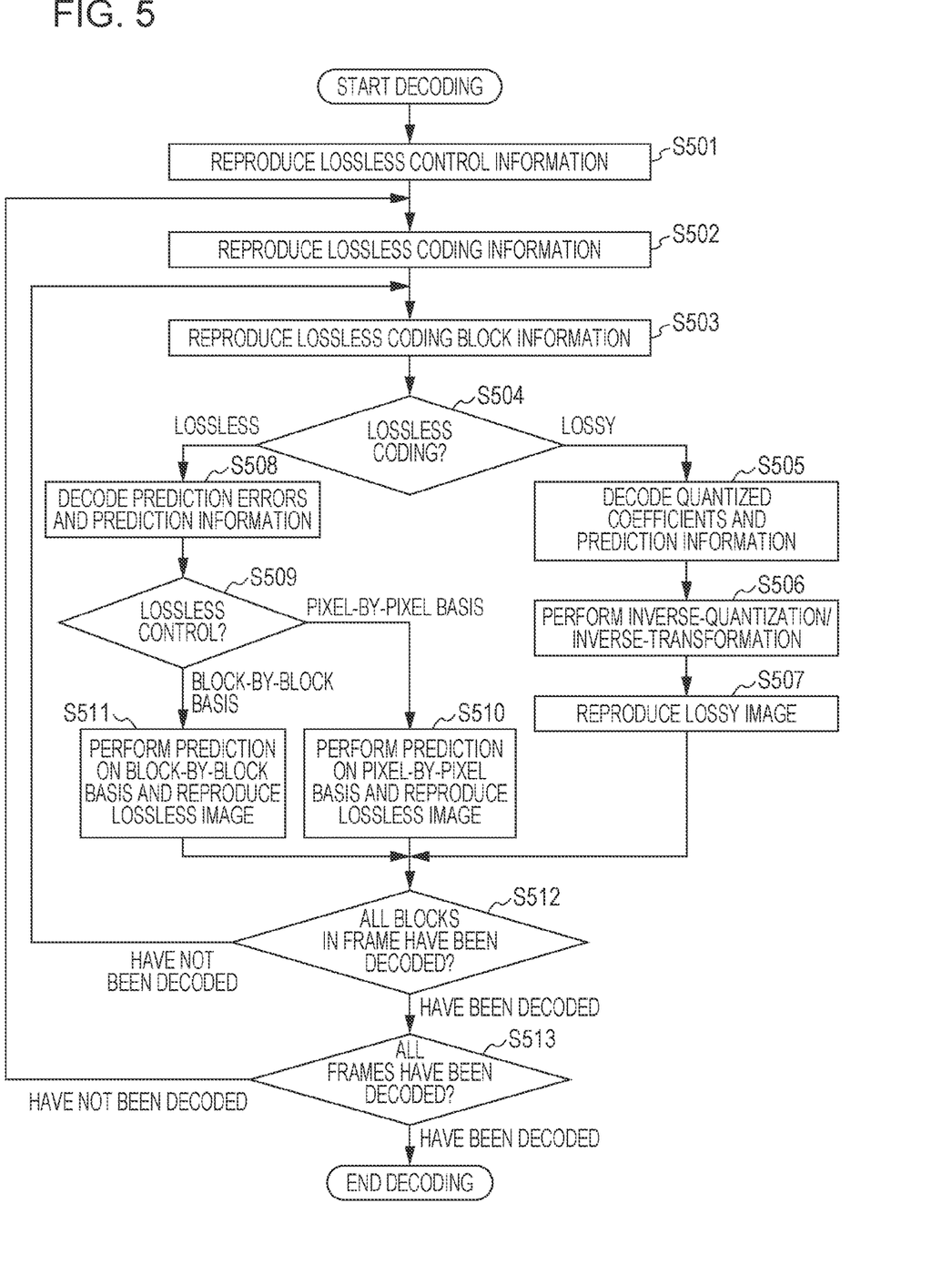
FIG. 5 is a flowchart of an image decoding process performed by the image decoding apparatus according to the second embodiment.

FIG. 5 is a flowchart of an image decoding process performed by the image decoding apparatus according to the second embodiment.

In step S501, the separating/decoding unit 202 separates information about the decoding process and coded data about coefficients from a bit stream, decodes the coded data of the header, and reproduces lossless control information. In step S502, the separating/decoding unit 202 further decodes the coded data of the header of each of the frames, and reproduces lossless coding information.

In step S503, the separating/decoding unit 202 further decodes coded data of each of the blocks, and reproduces the lossless coding block information. In step S504, the image decoding apparatus determines whether lossless coding or lossy coding has been performed on the block to be decoded, on the basis of the lossless coding block information reproduced in step S503. If lossless coding has been performed, the process proceeds to step S508. If lossy coding has been performed, the process proceeds to step S505.

In step S505, the separating/decoding unit 202 separates first coded data from the bit stream. The first decoding unit 203 decodes the separated first coded data, and reproduces quantized coefficients and first prediction information. In step S506, the inverse-quantization/inverse-transformation unit 204 performs inverse quantization on the quantized coefficients on a block-by-block basis so as to obtain transformed coefficients, and further performs inverse orthogonal transformation so as to reproduce prediction errors. In step S507, the first image reproduction unit 205 reproduces a predicted image on the basis of the first prediction information generated in step S505. The first image reproduction unit 205 further reproduces image data from the predicted image thus reproduced and the prediction errors generated in step S506.

In step S508, the separating/decoding unit 202 separates second coded data from the bit stream. The second decoding unit 207 decodes the separated second coded data, and reproduces prediction errors and second prediction information. In step S509, the second image reproduction unit 208 makes determination on the basis of the lossless control information reproduced in step S501. If the lossless control information has a value of 1 which indicates that intra prediction is to be performed on a pixel-by-pixel basis, the process proceeds to step S510. If the lossless control information has a value of 0 which indicates that intra prediction is to be performed on a block-by-block basis, the process proceeds to step S511.

In step S510, the second image reproduction unit 208 performs prediction on a pixel-by-pixel basis on the basis of the second prediction information generated in step S508, and reproduces a predicted image. The second image reproduction unit 208 further reproduces image data from the predicted image thus reproduced and the prediction errors generated in step S508.

In step S511, the second image reproduction unit 208 performs prediction on a block-by-block basis on the basis of the second prediction information generated in step S508, and reproduces a predicted image. The second image reproduction unit 208 further reproduces image data from the predicted image thus reproduced and the prediction errors generated in step S508.

In step S512, the image decoding apparatus determines whether or not all of the blocks in the frame have been decoded. If all of the blocks have been decoded, the process proceeds to step S513. Otherwise, the process returns back to step S503 to process the next block. In step S513, the image decoding apparatus determines whether or not all of the frames have been decoded. If all of the frames have been decoded, the decoding process is ended. Otherwise, the process returns back to step S502 to process the next frame.

The above-described configuration and operations enable decoding of a bit stream which allows control of multiple types of intra prediction process performed on a lossless coding block and which is generated in the first embodiment.

In the second embodiment, a lossless coding block and a lossy coding block are decoded by the first image reproduction unit 205 and the second image reproduction unit 208 which are independent from each other. The same image reproduction unit may reproduce images in a lossless coding block and a lossy coding block. Similarly, the first decoding unit 203 and the second decoding unit 207 which are independent from each other are used. Alternatively, the same decoding unit may decode a lossless coding block and a lossy coding block. When it is obvious that all of the blocks are a lossless coding block, the first decoding unit 203, the inverse-quantization/inverse-transformation unit 204, and the first image reproduction unit 205 may be omitted.

In the second embodiment, decoding of a bit stream illustrated in FIG. 6A is described. The configuration of a bit stream to be decoded is not limited to this. For example, the bit stream illustrated in FIG. 6B may be decoded. In FIG. 6B, the lossless-coding-information code of each of the frames is not included. FIG. 6B illustrates an example in which each of the blocks includes a lossless-coding-block-information code indicating whether or not lossless coding has been performed on a block-by-block basis. This configuration enables decoding of a bit stream which achieves an effect of easy differentiation between a lossless coding block and a lossy coding block.

Third Embodiment

The processing units illustrated in FIGS. 1 and 2 are described as those constituted by using hardware, in the above-described embodiments. Alternatively, the processes performed by the processing units in FIGS. 1 and 2 may be performed by using computer programs.

Figure 8:
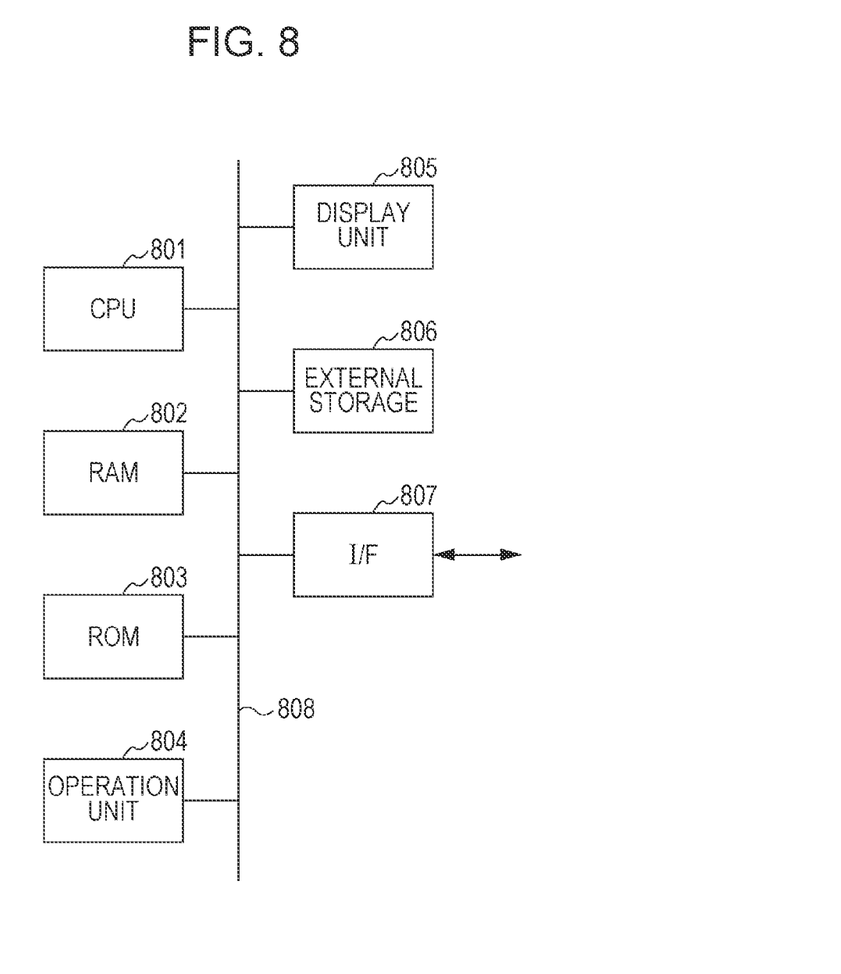
FIG. 8 is a block diagram illustrating an exemplary hardware configuration of a computer which may be applied to the image coding apparatus and the image decoding apparatus in the present invention.

FIG. 8 is a block diagram illustrating an exemplary hardware configuration of a computer which may be applied to the image coding apparatus and the image decoding apparatus according to the above-described embodiments.

A central processing unit (CPU) 801 controls the entire computer by using computer programs and data which are stored in a random-access memory (RAM) 802 and a read only memory (ROM) 803, and performs the processes which are described as those performed by the image processing apparatuses according to the above-described embodiments. That is, the CPU 801 functions as the processing units illustrated in FIGS. 1 and 2.

The RAM 802 has an area for temporarily storing computer programs and data which are loaded from an external storage 806, data obtained from the outside via an interface (I/F) 807, and the like. The RAM 802 further has a work area used when the CPU 801 performs various types of processing. That is, the RAM 802, for example, allocates an area as a frame memory, and provides other types of area as appropriate.

The ROM 803 stores setting data for the computer, boot programs, and the like. An operation unit 804 is constituted by, for example, a keyboard and a mouse. A user of the computer operates the operation unit 804 to give various types of instructions to the CPU 801. A display unit 805 displays processing results obtained by the CPU 801. The display unit 805 is constituted by, for example, a liquid crystal display.

The external storage 806 is a mass information storage device which is typified by a hard disk drive. The external storage 806 stores an operating system (OS) and computer programs for enabling the CPU 801 to achieve the functions of the units illustrated in FIGS. 1 and 2. The external storage 806 may further store pieces of image data to be processed.

The computer programs and the data which are stored in the external storage 806 are loaded to the RAM 802 under the control of the CPU 801 as appropriate, and are ready to be processed by the CPU 801. A network, such as a local-area network (LAN) or the Internet, and other apparatuses, such as a projector and a display, may be connected to the I/F 807. The computer may obtain and transmit various types of information via the I/F 807. A bus 808 connects the above-described units to each other.

The operations described by using the above-described flowcharts are controlled by using the above-described configuration in which the CPU 801 is the main unit.

Other Embodiments

In the above-described embodiments, the lossless-coding-information code having a value of 1 indicates that a bit stream is likely to include a lossless coding block. The lossless-coding-information code having a value of 0 indicates that a bit stream is unlikely to include a lossless coding block. However, the present invention is not limited to this, and the lossless-coding-information code may have more than one bit. Alternatively, the lossless-coding-information code having a value of 0 may indicate that a bit stream is likely to include a lossless coding block. The lossless-coding-information code having a value of 1 may indicate that a bit stream is unlikely to include a lossless coding block.

In the above-described embodiments, the lossless-control-information code having a value of 1 indicates that an intra prediction process is performed on a lossless coding block on a pixel-by-pixel basis. The lossless-control-information code having a value of 0 indicates that an intra prediction process is performed on a lossless coding block on a block-by-block basis. However, the present invention is not limited to this, and the lossless-control-information code may have more than one bit. Alternatively, the lossless-control-information code having a value of 0 may indicate that an intra prediction process is performed on a lossless coding block on a pixel-by-pixel basis. The lossless-control-information code having a value of 1 may indicate that an intra prediction process is performed on a lossless coding block on a block-by-block basis.

In the above-described embodiments, the lossless-coding-block-information code having a value of 1 indicates that the block is subjected to lossless coding. The lossless-coding-block-information code having a value of 0 indicates that the block is subjected to lossy coding. The present invention is not limited to this. That is, the lossless-coding-block-information code may have more than one bit. Alternatively, the lossless-coding-block-information code having a value of 0 may indicate that the block is subjected to lossless coding. The lossless-coding-block-information code having a value of 1 may indicate that the block is subjected to lossy coding.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a RAM, a ROM, a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image decoding apparatus decoding a bit stream generated by encoding an image, the image decoding apparatus comprising:
   a first decoding unit configured to decode a block to be processed, using a first decoding process including transformation process; and
   a second decoding unit configured to decode a block to be processed, using a second decoding process not including the transformation process,
   wherein the second decoding unit is capable of applying, to the block to be processed, at least either the second decoding process using an intra prediction mode in which a pixel not included in the block to be processed is used or the second decoding process using a DPCM process on a basis of a pixel included in the block to be processed,
   wherein a first flag independent from prediction mode information about the intra prediction mode is decoded, the first flag being used to determine whether the second decoding process using the DPCM process is applied or not to the block to be processed,
   wherein it is determined, in a unit of a block included in the image, whether the second decoding process using the DPCM process is applied or not, in accordance with the first flag,
   wherein the second decoding process using the DPCM process is applied to the block to be processed, in a case where it is determined based on the first flag that the second decoding process using the DPCM process is applied to the block to be processed, and
   wherein in the first decoding process, prediction errors are derived by performing the transformation process for transformed coefficients.

2. The image decoding apparatus according to claim 1, wherein a second flag is decoded, the second flag being used for determining whether the first decoding process is applied or the second decoding process is applied.

3. The image decoding apparatus according to claim 1, wherein the second decoding unit is capable of applying the second decoding process using the DPCM process in a horizontal direction or a vertical direction.

4. An image decoding method for decoding a bit stream generated by encoding an image, the image decoding method comprising:
   decoding a block to be processed, using a first decoding process including transformation process; and
   decoding a block to be processed, using a second decoding process not including the transformation process,
   wherein the decoding the block to be processed using the second decoding process is capable of applying, to the block to be processed, at least either the second decoding process using an intra prediction mode in which a pixel not included in the block to be processed is used or the second decoding process using a DPCM process on a basis of a pixel included in the block to be processed,
   wherein a first flag independent from prediction mode information about the intra prediction mode is decoded, the first flag being used to determine whether the second decoding process using the DPCM process is applied or not to the block to be processed,
   wherein it is determined, in a unit of a block included in the image, whether the second decoding process using the DPCM process is applied or not, in accordance with the first flag,
   wherein the second decoding process using the DPCM process is applied to the block to be processed, in a case where it is determined based on the first flag that the second decoding process using the DPCM process is applied to the block to be processed, and
   wherein in the first decoding process, prediction errors are derived by performing the transformation process for transformed coefficients.

5. The image decoding method according to claim 4, wherein a second flag is decoded, the second flag being used for determining whether the first decoding process is applied or the second decoding process is applied to the block to be processed.

6. The image decoding method according to claim 4, wherein the second decoding unit is capable of applying the second decoding process using the DPCM process in a horizontal direction or a vertical direction.

7. A non-transitory computer-readable storage medium storing a program for causing a computer to execute decoding of a bit stream generated by encoding an image, the program comprising:
   computer-executable instructions for decoding a block to be processed, using a first decoding process including transformation process; and
   computer-executable instructions for decoding a block to be processed, using a second decoding process not including the transformation process,
   wherein the decoding the block to be processed using the second decoding process is capable of applying, to the block to be processed, at least either the second decoding process using an intra prediction mode in which a pixel not included in the block to be processed is used or the second decoding process using a DPCM process on a basis of a pixel included in the block to be processed, wherein a first flag independent from prediction mode information about the intra prediction mode is decoded, the first flag being used to determine whether the second decoding process using the DPCM process is applied or not to the block to be processed, wherein it is determined, in a unit of a block included in the image, whether the second decoding process using the DPCM process is applied or not, in accordance with the first flag, wherein the second decoding process using the DPCM process is applied to the block to be processed, in a case where it is determined based on the first flag that the second decoding process using the DPCM process is applied to the block to be processed, and wherein in the first decoding process, prediction errors are derived by performing the transformation process for transformed coefficients.

* * * * *